Jan. 4, 1966  R. C. NEMETH  3,227,872
MASS SPECTROMETER LEAK DETECTING DEVICE IN
COMBINATION WITH A GETTERING CHAMBER
Filed Aug. 29, 1962  4 Sheets-Sheet 1

INVENTOR.
ROBERT C. NEMETH
BY Gustav Drews
his ATTORNEY

Jan. 4, 1966
R. C. NEMETH
3,227,872
MASS SPECTROMETER LEAK DETECTING DEVICE IN
COMBINATION WITH A GETTERING CHAMBER
Filed Aug. 29, 1962
4 Sheets-Sheet 2
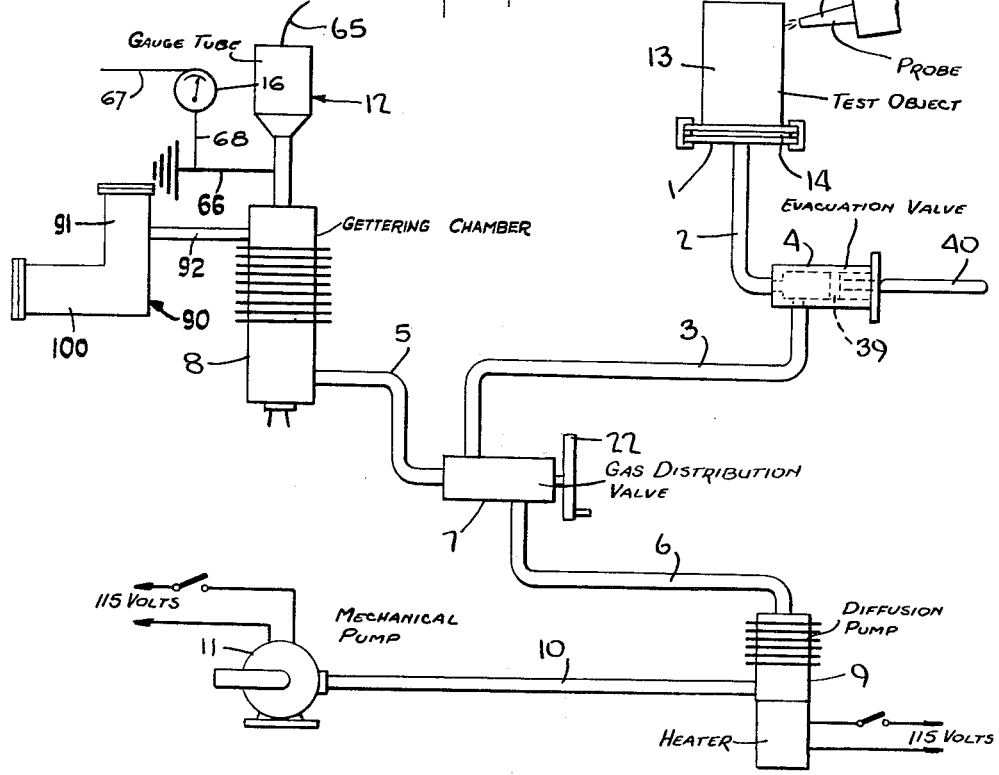
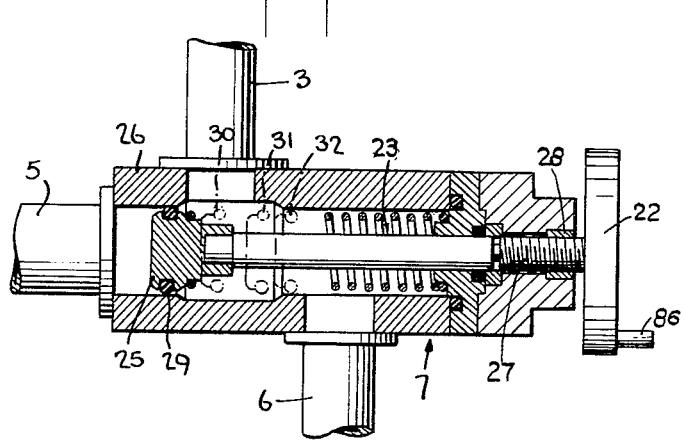
INVENTOR.
ROBERT C. NEMETH
BY Gustav Drews
his ATTORNEY

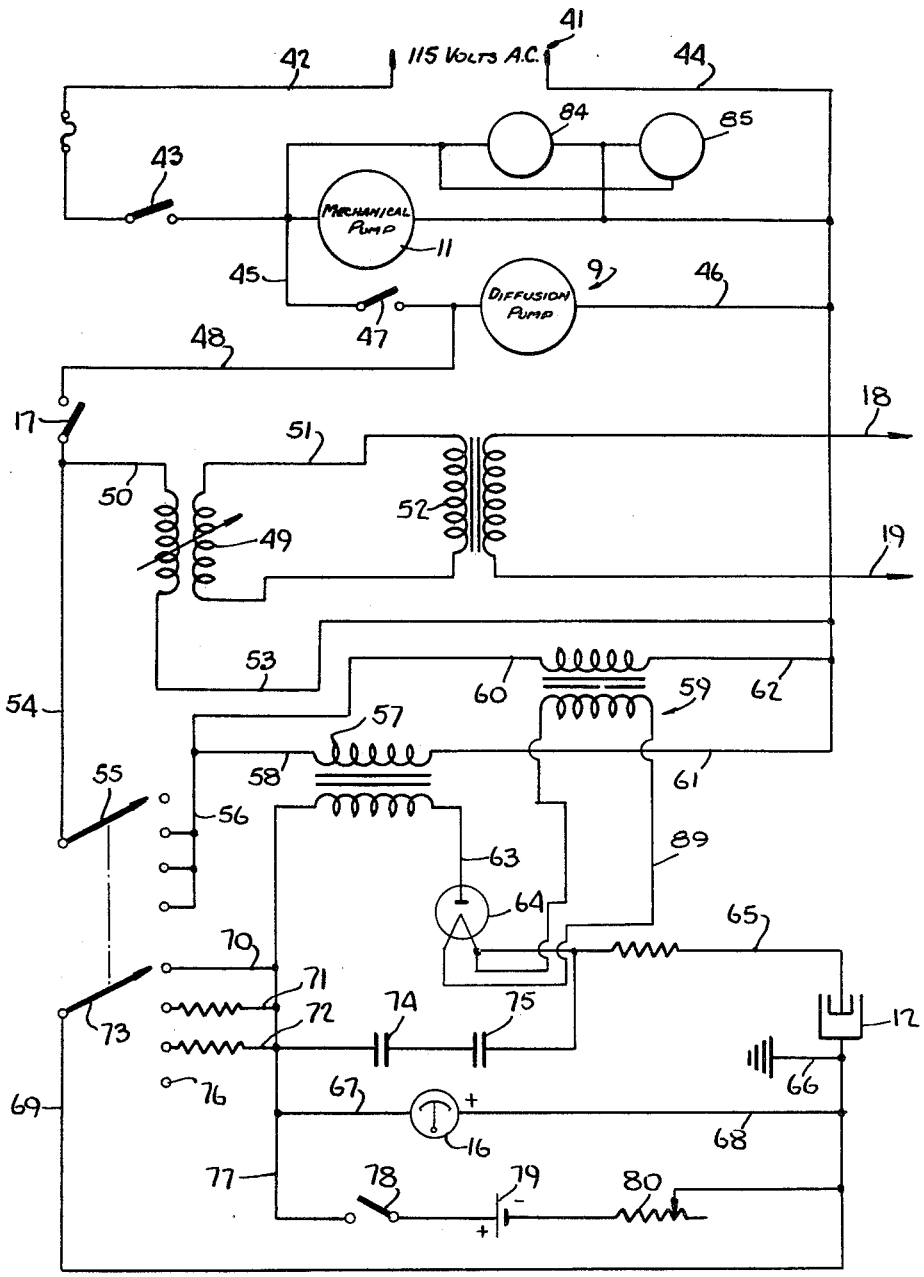

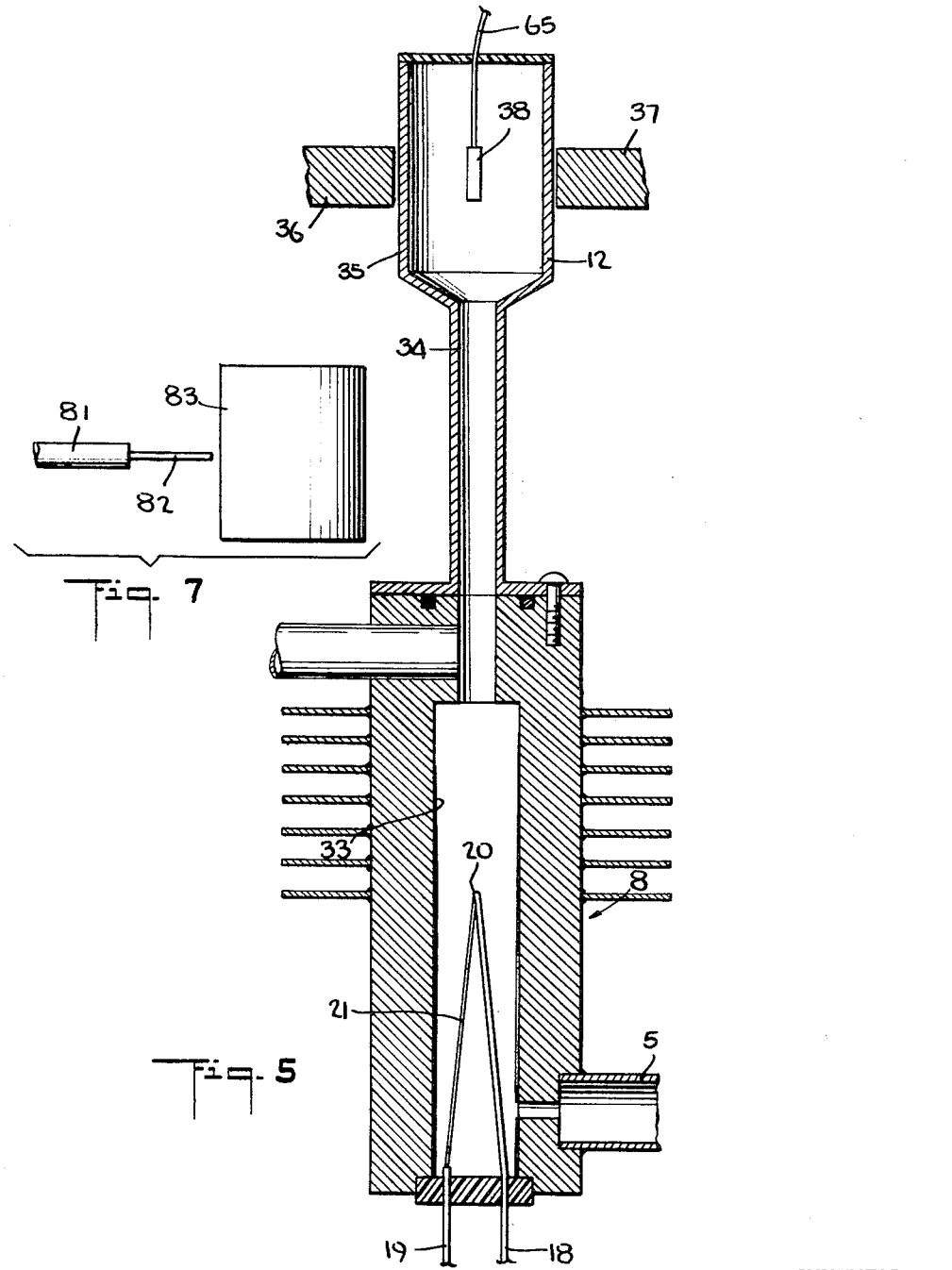

United States Patent Office 3,227,872
Patented Jan. 4, 1966

3,227,872
MASS SPECTROMETER LEAK DETECTING DEVICE IN COMBINATION WITH A GETTERING CHAMBER
Robert C. Nemeth, Huntington, N.Y.
(81 Teed St., Huntington Station, N.Y.)
Filed Aug. 29, 1962, Ser. No. 220,321
2 Claims. (Cl. 250—41.9)

This invention relates to leak detecting devices in general and more particularly to devices for detecting leaks of infinitesimally small size by means of inert noble tracer gases such as helium, argon, neon, and the like, and to the method for detecting such leaks with inert noble tracer gases such as helium, argon, neon, and the like. The present application is a continuation-in-part of my application for patent Serial No. 815,554 filed May 25, 1959 now U.S. Patent No. 3,070,992.

While excellent results have been achieved for detecting larger leaks with devices such as disclosed in my application aforesaid, when the gas used for detecting leaks is one of a greater concentration than helium, such as argon, the gases of this greater concentration would not serve in detecting infinitesimally small leakage rates such as 10–11 standard cubic centimeters per second or smaller.

In view of the foregoing, it is an object of the present invention to provide a pressure gauge of high sensitivity in which helium is used as the signal gas to detect leaks of an infinitesimally small leakage rate, that is approximately one one-thousandth of the rate that can be detected with the methods heretofore used, and the pressure gauge is that disclosed in the aforesaid application for patent Serial No. 815,554 and is arranged in series with a special mass spectrometer type tube or partial pressure gauge.

It is still a further object of the present invention to provide a combination of the pressure gauge disclosed in my aforesaid application for patent and the mass spectrometer type tube in series in which the mass spectrometer type tube acts as a booster for the pressure gauge disclosed in my aforesaid application for patent Serial No. 815,554.

Furthermore it is another object of the present invention to provide an improved method for detecting leaks of an infinitesimally small size with a signal gas of an extremely low concentration such as helium.

These and other features, capabilities and advantages of the present invention will appear from the subjoined detailed description of specific embodiments thereof illustrated in the accompanying drawings in which FIG. 1 is a side elevation partly diagrammatic showing the improved combination.

FIG. 3 is a diagrammatic view illustrating the improved pressure gauge in association with a container to be tested for leakage.

FIG. 4 is a wiring diagram of a system such as illustrated in FIG. 3.

FIG. 5 is an enlarged section partly shown schematically of the filament chamber, and of a cold cathode vacuum gauge constituting the pressure gauge of the system illustrated in FIG. 3.

FIG. 6 is a fragmental sectional view of the signal valve.

FIG. 7 is an exploded elevation of a modification of the testing object and testing nozzle.

Figure 2:
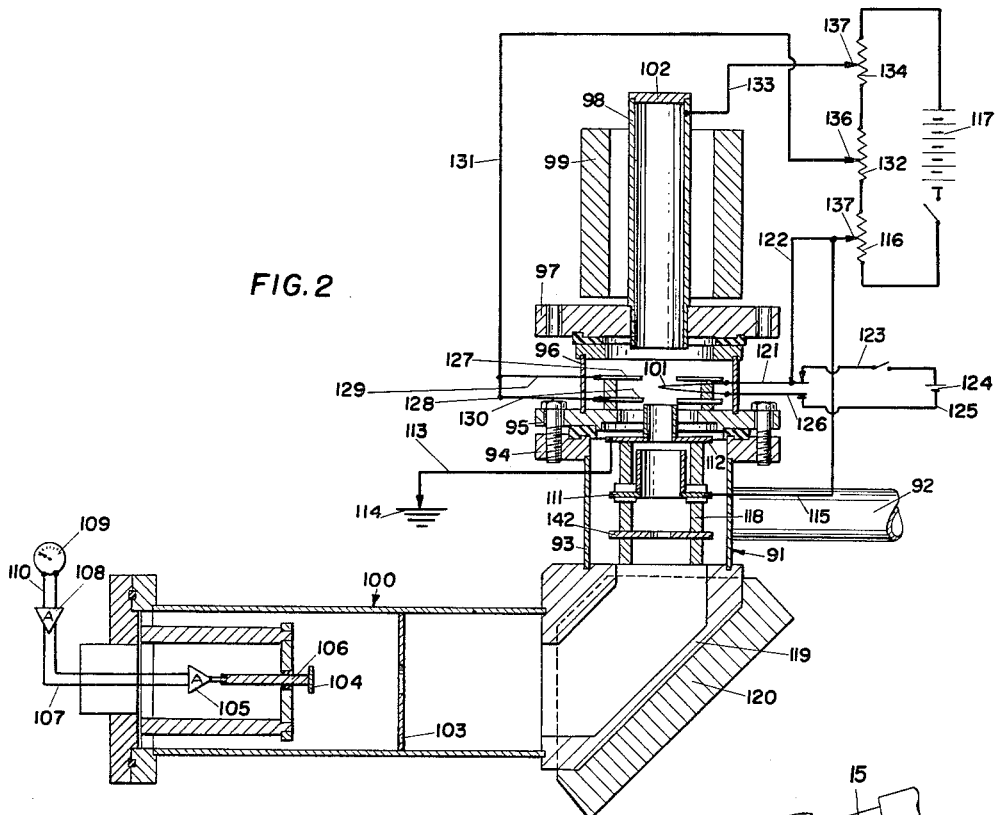
FIG. 2 is a side elevation partly in section of the booster or spectrometer type tube.
Figure 1:
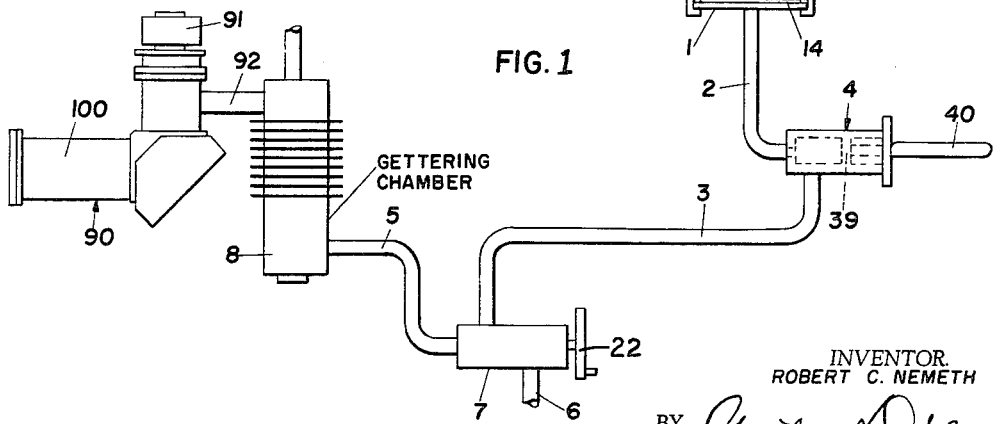

When the mass spectrometer type tube 90, L-shaped in the present instance, illustrated in FIGS. 1 and 2 is used in combination with or as a booster for the pressure gauge system illustrated in FIGS. 3 to 7 inclusive, the downwardly extending leg 91 is connected to the gettering chamber 8 by the conduit 92.

With the pressure gauge illustrated in FIGS. 3 to 7 inclusive, excellent results have been achieved when the gas to be detected is one of a greater concentration than helium, such as argon, as disclosed in my aforesaid patent application Serial No. 815,554. With that system, the argon was sprayed upon the container to be tested 13, and then drawn in by a series of pumps to the gettering chamber 8 and from the gettering chamber to the gauge 12 where the amount of argon present was determined. However, when the gas is of an extreme low concentration such as helium, it has been found that if the pressure gauge illustrated in FIGS. 3 to 7 was combined with the mass spectrometer illustrated in FIGS. 1 and 2, that then without difficulty the amount of helium in the atmosphere or the amount of helium sprayed onto the container 13 to be tested can readily be determined.

The pressure gauge, sorpitron, or differential sorption tube, is used in series with the mass spectrometer type tube illustrated in FIGS. 1 and 2 and is part of a system which consists as illustrated in FIG. 3 primarily in a platform 1 at the end of the conduit 2 which is connected to the conduit 3 by the evacuation valve 4. This conduit 3 in turn is connected to the conduits 5 and 6 by the signal gas distribution valve 7. The conduit 5 extends from the signal valve 7 to the filament or gettering chamber 8 while the conduit 6 in turn extends from the valve 7 to the diffusion pump 9. The diffusion pump 9 in turn is connected by the conduit 10 to the mechanical pump 11. The filament or gettering chamber 8 is interposed between the conduit 5 and the pressure gauge or gauge tube 12 in the present instance illustrated as a cold cathode discharge vacuum gauge in FIG. 5. When the system is used for detecting a leak, the device such as the container 13 is connected to the platform 1 by any suitable leak proof seal such as a rubber O ring 14 and thereupon when the system is in operation, a probe gas such as helium gas sprayed on the outer face of the container from the supply through the nozzle 15.

In the operation of this system, the evacuation valve 4 first is actuated to shut off communication between the conduits 2 and 3 and the signal gas distribution valve 7 is actuated to shut off communication between the conduits 5, from 3 and 6. Thereupon the mechanical pump 11 is initiated and when the proper evacuation has been obtained, about 0.5 mm. of mercury, determined by the discontinuance of the gurgling in the mechanical pump 11, the diffusion pump 9 is connected into series with the mechanical pump 11 and the evacuating operation continued for about fifteen minutes when the signal valve 7 will be actuated to establish communication between the conduits 3 and 5 and the conduit 6. Thereupon the evacuating operation continues until the meter 16 indicates a pressure of about $1 \times 10^{-3}$ to $1 \times 10^{-6}$ mm. of mercury absolute pressure. Thereupon the filament switch 17, FIGS. 4 and 5, is closed to establish current in the conductors 18 and 19. The conductor 18 is connected at 20 to a titanium filament 21 which is connected to the conductor 19. The evacuating operation will then continue until the pressure in the gettering chamber 8 and gauge tube 12 has been reduced to $1 \times 10^{-3}$ to $1 \times 10^{-6}$ mm. of mercury absolute pressure. Thereupon, if the system is to be used for determining a leak, the signal valve 7 will be actuated to shut off communication between the conduit 5 and conduit 6 and continue communication between the conduits 3 and 6 and then actuate the valve 4 to establish communication between the conduits 2 and 3 and of course with the interior of the container 13. The low pressure pumps 11 and 9 will continue their evacuating action until the pressure in the container 13 via the conduits 2 and 3 has been reduced to $5 \times 10^{-2}$ mm. of mercury absolute pressure. Thereafter the signal valve 7 will be actuated to establish divided flow between conduits 3, 5 and 6. In case of large leaks the communication between the pumps 11, 9 and the gettering chamber 8 will continue as aforesaid. In case of minute leaks, however, it has been found desirable to actuate the valve 7 to shut off communication between the conduit 6 and the conduit 5 and rely entirely upon the pumping action exercised by the gettering chamber 8.

For detecting leaks according to the present invention, a sprayer having the nozzle 15 of an inert gas such as argon, helium, neon, and the like may be directed against the outer face of the container 13. It will be found that if there is a leak in the container 13, the helium will enter the container 13 through the leak and pass into the gettering chamber 8 and since the helium so entering the chamber 8 is not eliminated by the coating on the wall of the chamber 8, the increase in pressure in the gauge 12 will be registered upon the conventional D.C. current meter 16 shown in FIG. 4. In accordance with convention, the sprayer nozzle 15 will be moved around the container to show where the greatest increase occurs which will coincide with the position of the nozzle 15 nearest to or at the leak.

The control of the signal valve 7 is effected through the wheel 22 connected to the outer end of the shaft 23 having the valve head 25 which operates in the valve chamber 26, see FIG. 6. In other words, when the wheel 22 is turned, the valve head 25 may either be in the position shown in full lines in FIG. 6 where it will shut off communication from the conduit 5 to both the conduits 3 and 6 and the initial evacuation will occur which will merely reduce the pressure in the container 13. Thereupon the wheel 22 is actuated so that the O ring gasket 29 will move to the dotted line position 30 where communication will be established between the conduit 5 and both of the conduits 3 and 6, but slightly restricted to conduit 5. This position of the valve head 25 corresponds to the position of the same when performing the initial leak test. If the leak can be detected in this position of the valve head, it will be unnecessary to test any further. If the leak is not detected in the position 30 of the O ring 29, the wheel 22 is actuated into the position where the gasket 29 coincides with the dotted line position 31 when the communication to the conduits 3 and 5 is unrestricted, but slightly restricted with regard to the conduit 6. In this position, the evacuation or pumping action will be exercised primarily by the gettering chamber 8 and the pressure gauge 12. The gettering chamber 8 is relied upon primarily to pump out the residual gas and the gauge 12 to pump out the inert gas. If difficulty is still encountered in detecting the leak, then the wheel 22 is actuated into the position where the gasket 29 of the valve head 25 coincides with the dotted line position 32 in the valve chamber 26 where communication to the conduit 6 is entirely shut off but a free and unobstructed passage afforded between the conduits 5 and 3 so that in this position there will be no leakage or flow of any of the gases in the gettering chamber 8 and gauge 12 to the pumps 9 and 11 and the gettering chamber 8 and gauge 12 relied on exclusively for withdrawing the gases from the container 13. When the mechanical pump 11 and diffusion pump 9 are in operation, the lamps 84 and 85 will be energized. These lamps 84 and 85 however, may be omitted without affecting the operation of the present mechanism. The actuation of the shaft 23 by the wheel 22 so that the valve head 25 moves into the full line position shown in FIG. 6, or the dotted line positions 30, 31 and 32 is effected by the threaded portion 27 of the rod 23 threadedly cooperating with the fixed bearing 28. Preferably the wheel 22 has a handle 86.

From the foregoing it will thus be seen that the position of the valve head 25 will be located in the full line position shown in FIG. 6 initially to enable the pumps 9 and 11 to withdraw the gases from the container 13 and substantially evacuate the same. The position of the valve head 25 where its gasket 29 coincides with the dotted line position 30 will be obtained for an initial test for a leak, the position of the valve head 25 where the gasket coincides with the dotted line position 31 where a little difficulty is encountered in determining the leak, and the valve head 25 actuated into the position where the gasket 29 coincides with the dotted line position 32 when extreme difficulty is encountered in determining the leak.

The unique feature of this part of the present invention resides in the arranging of the gettering chamber 8 in series with the pressure gauge 12. In the gettering chamber 8 due to the reaction of the titanium filament 21 when heated, it will vaporize and form a coating on the inner wall 33 which may be composed of brass or the like metal. When the titanium gas is so vaporized and deposited upon the inner face of the wall 33 it will either adsorb, absorb, or chemisorb the residual gas and vapors, except of course the inert gases, leaving only the inert gases and in the present instance, the helium gas being used in the sprayer by way of the nozzle 15 to pass into the pressure gauge 12. The helium gas will pass into the pressure gauge 12 through the neck 34, into the chamber 35 and past the configuration of the magnetic poles 36 and 37 and pressure gauge anode 38 to form ions which will travel to the interior face of the wall 35 composed of any conductive metal, such as aluminum, copper, or the like. The reaction on the configuration of the pressure gauge 12, to wit on the magnetic poles 36 and 37 and pressure gauge anode 38 will reflect the pressure in the chamber 35 on the meter 16.

The evacuation valve 4 also may be manually operated. The passage from the conduit 2 to the conduit 5 will be shut off by the valve head 39 through the handle 40 when it is desired to replace the test object such as the container 13. On the other hand after the test object, to wit, the container 13 is positioned on the platform 1, then the handle 40 will be actuated to move the valve head 39 into the position shown in FIG. 3 to establish communication between the conduits 2 and 3.

Excellent results have been achieved when a wiring diagram such as illustrated in FIG. 4 is used. According to this diagram, a source of current, to wit, 115 volts A.C. at 41 is connected by the conductor 42 to the mechanical pump 11 having a switch 43 in the conductor. The source of current 41 in turn is connected by the conductor 44 to the mechanical pump 11. In turn the conductor 42 is connected by the conductor 45 to the diffusion pump 9 and the conductor 44 is connected by the conductor 46 to the diffusion pump 9. A switch 47 is provided in the conductor 45. The source of current 41 is connected by the conductors 42, 45 and 48 to the power-on switch 17 for the filament circuit which in turn is connected to the variac or variable transformer 49 by the conductor 50. The variable transformer 49 is connected by the conductor 51 to the filament transformer 52 to supply the voltage to the gettering chamber 8. The variable transformer 49 is also connected by the conductor 53 to the conductor 44 back to the source of current 41. The filament transformer 52 is connected by the conductors 18 and 19 to the gettering chamber 8. The conductor 54 is connected by the switch 55 to the conductor 56 which is connected to the high voltage transformer 57 by the conductor 58 and to the filament transformer 59 by the conductor 60 to supply the voltage to the rectifier 64. This voltage transformer 57 is connected by the conductor 61 to the main conductor 44 back to the source of current 41 and the filament transformer 59 is connected by the conductor 52 to the main conductor 44. The high voltage transformer 57 is connected by the conductor 63 to the diode or half wave rectifier 64 which in turn is connected by the conductor 65 to the pressure gauge 12 which pressure gauge is connected to ground by the conductor 66. The function of the rectifier 64 is to supply the necessary D.C. high voltage to the anode 38 of the pressure gauge 12. The conductor 63 of the high voltage transformer 57 is connected by the conductor 67 to the meter 16 which meter in turn is connected by the conductor 68 to the conductor 66 connected to ground. In the aforesaid transformers, the conductors 50 and 53 constitute the primary winding and the conductor 51 the secondary winding of the variable transformer 49. The same conductor 51 in turn constitutes the primary winding and the conductors 18 and 19 constitute the secondary winding of the filament transformer 52. The conductors 60 and 62 constitute the primary winding and the conductor 89 the secondary winding of the filament transformer 59 and finally, the conductors 58 and 61 constitute the primary winding and the conductor 63 constitutes the secondary winding of the high voltage transformer 57. The conductor 69 in turn is connected to the conductor 63 of the high voltage transformer 57 through the conductors 70, 71 and 72, the contacts of which conductors are adapted to be connected to the switch arm 73. The conductor 69 in turn is also connected to the conductor 66 and to ground. When the switch arm 73 is connected to the conductor 71 and 72, it will shunt out the current to the meter 16. When it is connected to the conductor 70 which is the off position, the high voltage condensers 74 and 75 will be shortened to ground through the conductor 69. In turn when the switch arm 73 is in engagement with the contact 76, then the meter will be opened and the meter 16 will read its full value.

When there is an extremely slight leakage it may be desirable to include the conductor 77 which is connected to the conductor 67 of the meter 16 and is also connected to the conductor 66 to a ground. This conductor 77 has connected to it a switch 78, a conventional one and one-half volt battery 79, and a potentiometer 80 in which case when closing the switch 78, the output can be balanced by adjusting the potentiometer 80 to correct the reading of the meter 16.

On the other hand, if there are sufficient inert gases in the atmosphere to affect the reading of the meter 16 without the supply introduced through the nozzle 15 into the test object 13, this will be registered by the gauge 12. The circuit through the conductor 67 constitutes an electrical background eliminator to enable reducing the reading on the meter 16 to eliminate the pressure created by the helium that might be in the atmosphere or gases that might be evolved from the gauge elements. When there is such a sufficient amount of helium in the air or a sufficient amount of gas evolved by the gauge elements, the needle will register so high that it will be difficult if not impossible to detect the increased pressure that results from the introduction of helium gas through the nozzle 15. By cutting in the circuit through the conductor 77 the needle may be positioned on a more sensitive area so that smaller meter deflections can be read. The gettering chamber 8 and vacuum gauge for gauge tube 12 shown in FIG. 5 are interposed between the conductors 18, 19 in FIG. 4 and the conductor 65 in which conductors there is located the switch 17, see the upper left hand side of FIG. 4. The gettering chamber 8 illustrated in FIG. 3 is not illustrated in FIG. 4 since it is connected to the conductors 18, 19 which are to the right of the wiring diagram illustrated in FIG. 4.

The method of detecting leaks as aforesaid is of course indicative of one specific way in which the invention can be used. It is conceivable that the test object can be filled with an inert gas and separated from the system and then the conduit 2 provided with a nozzle having a small orifice such as illustrated in FIG. 7 where the conduit 81 replaces the conduit 2 and is not connected vit the platform 1 to the test object and the conduit 81 in this case is provided with the nozzle 82 having a fine orifice to scan the outer face of the container 83 constituting the test object which is filled with an inert gas.

The description of the mass spectrometer type tube 90 for use with the pressure gauge system now follows:

From the conduit 92 the gas in the gettering chamber 8 of the pressure gauge system illustrated in FIGS. 3 to 7 inclusive is permitted by random molecular flow to pass into the container 93 of the source end which is connected by flanges 94 and 95 to the container 96 which in turn is connected to the base 97 of the drift tube 98 around which is positioned the drift tube magnet 99.

The gas may pass from the source end 91 to the collector end 100.

In actual practice if the gas has been restricted in the pressure gauge system illustrated in FIGS. 3 to 7 inclusive to helium gas, this gas will pass through the tube 92 into the source end 91 and from there flow at random up or down. If the source and extends up as illustrated, then the helium passing upwardly through the container 93 will pass between the filament 101 preferably composed of tungsten and the lower end of the drift tube 98. When passing through this gap between the filament 101 and the lower end of the drift tube 98 which has a higher potential than the potential of the filament 101, the electrons pass from the filament 101 to the drift tube 98 being attracted by the drift tube 98, and the gas passing through the gap will then enter the drift tube 98, become ionized by the electron beam which forms a spiral as it extends up the drift tube 98 to the far end 102 because of the magnetic field caused by the magnet 99.

After the gas has become so ionized, it will then return through the final baffle electrode 142 of the source end 91 and enter the collector end 100. Those ions of helium will be deflected 90° and thereby isolated when passing through the analyzing block 119 to pass in a channel through the baffle 103 and strike the plate 104. After they strike the plate 104, where they release their charge to the plate 104, the charge is then preamplified by the preamplifier 105 connected to the plate 104 by the ion collector plate 106. From the preamplifier 105 the ions will pass to the conductive circuit 107 to the D.C. electrometer amplifier 108 which is connected to the output meter 109 by the conductive circuit 110.

In the tubular section 93 of the source end there is provided a focusing and accelerating electrode 111 and a baffle 112. The baffle 112 is grounded by the conductor 113 to ground 114. The focusing and accelerating plate 111 is connected by the conductor 115 to the rheostat 116 of the high voltage final battery electrode 117. The baffle 142 merely aids in guiding the stream of gas through the tubular section 118 into the analyzing block 119 which also serves to support the magnet 120. The magnet 120 on the block 119 bends the ions of the helium gas about 90° and thereby isolates them to flow through the collector end 100 through the opening in the baffle 103 and onto the plate 104.

The filament 101 has its conductor 121 connected by the conductor 122 to the rheostate 116 of a high voltage source of current, such as the high voltage battery 117 for cooperating with the drift tube 98 to form electrons between the filament 101 and the drift tube 98 and has another conductor 123 connected to a low voltage source of current such as the low voltage battery 124 from which low voltage battery 124 continues the conductor 125 to the other conductor 126 of the filament 101 to heat the filament to incandescence to achieve thermionic emission.

The focusing and accelerating electrodes 127 and 128 are connected by the conductors 129 and 130 respectively to the common conductor 131 which in turn is connected to the rheostat 132.

The upper end 102 of the drift tube 98 is connected by the conductor 133 to the rheostat 134.

By means of this mass spectrometer when associated with the pressure gauge illustrated in FIG. 3 after the helium has been isolated and passes from the gettering chamber 8 by means of the source end 91, and the gas is ionized as aforesaid, the output meter 109 will register the signal proportionate to the quantity of helium passing into the testing object 13.

The rheostats 116, 132 and 134 provided, vary 150 to 300 volts, 450 to 500 volts, and 500 to 600 volts respectively. When the signal gas selected is helium, excellent results have been achieved when the contact 135 for the rheostat 116 connected to the conductors 115 and 122 provided about 300 volts, when the contact 136 for the rheostat 132 connected to the conductor 131 provided between 430 and 450 volts, and the contact 137 for the rheostat 134 connected to the conductor 133 provided about 580 volts. The rheostats are provided in order to adjust the apparatus for different gases to accommodate variations in equipment. As an instance, to adjust the voltage of the accelerating electrode 116, the contact 135 may be moved along the rheostat 116. In turn, the voltage of the filament 101 may be controlled by the rheostat 116 connected to the conductors 121 and 126 of the filament 101 and by the conductors 122 and 125 respectively. Still furthermore, the voltage of the electrodes 127 and 128 are controlled by the rheostat 132 which is connected to the electrodes 127 and 128 by the common conductor 131 and the individual conductors 129 and 130. The voltage of the drift tube 98 can be regulated by the rheostat 134 connected to the drift tube 98 by the conductor 133.

With the present invention the rapid, accurate, and consistently reliable measurement of leak rates as low as $5 \times 10^{-14}$ std. cc./sec., a sensitivity of about 1000 times greater than that of any of the leak detectors today in use. As a result, the shelf-life projection of a vacuum tube with a volume of 100 cc. is approximately eight years as compared to the shelf-life of tubes tested of the less sensitive type leak detectors today in use which rarely exceed a life of one week. More generally, the system of the present invention consists of a sorpitron, or differential sorption tube in series with the improved mass spectrometer type tube here disclosed.

The test gas must first enter the Sorpitron tube where a gettering or filtering action takes place as follows:

The titanium wire filament is heated causing the titanium to vaporize to the walls of the tube. Reactive gases that may accompany the test gas, such as nitrogen, hydrogen, oxygen, organic vapors, and others will randomly contact the titanium film on the wall and absorb or combine chemically effectively to be filtered out. Since the inert gases such as helium or argon will not react with the titanium film, they pass into the mass spectrometer type tube in a clean, more concentrated form.

The remaining test gas still containing the inert helium tracer is then ionized by means of an electron beam generated in a new improved ion source especially designed to increase the ionization efficiency. The ions formed are focused both magnetically and electrostatically and are accelerated through a fixed magnetic field in the analyzing block 119 where the helium ions are deflected 90° and are collected. The current generated is preamplified by an electrometer tube in the vacuum and is then further amplified by a new improved high gain D.C. amplifier 108. The signal generated is proportional to the size of the leak in the object being tested and is indicated on the output meter 109.

To further explain the advantages, the conventional helium mass spectrometer type leak detectors are susceptible to hydrogen background. Although the detector may be tuned for mass 4 helium, an increase in hydrogen gas in the spectrometer will cause an increase in output reading. This reading can be confused as a leak indication or raise the output signal so that small increment signals cannot be seen. The differential sorption tube or sorpitron placed in series with spectrometer tube reduces the hydrogen concentration and organic vapors which also can be converted to hydrogen because of the incandescent spectrometer tube filament.

Furthermore, the conventional mass spectrometer leak detectors must, even to achieve normal sensitivity have a system pumping speed of at least 2 liters per second to keep the background low. Since the present sorption system pumps residual gases at this high speed and the inert gas at more than a thousand times less, a high concentration of the specified tracer gas is admitted to the spectrometer tube, and consequently higher sensitivity.

Still furthermore, the new mass spectrometer ion source permits more of the gas in the spectrometer tube to be ionized and consequently more ion current and higher sensitivity.

As aforesaid, the new combination senses only helium. The first sorption stage "filtered out" reactive gases leaving all inert gases such as argon, helium neon. The new machine now receives the filtered inert gases and separates out helium from the other inert noble gases such as argon. Since helium is only present in the atmosphere to several parts per million parts of air, less "tracer gas background" is present from a leak so that ultra small leaks can be detected.

With a view to including in the specification the terms used in the claims, please note that the ion source of the mass spectrometer tube sought to be claimed is closed at one end 102 and open at the opposite end 91 for discharge of an ion stream, said source comprising a gas connection 92 for supply of the gas to be ionized, an electron-emitting cathode 101, a long drift tube 98 disposed on the side of the cathode 101 remote from the discharge end 91 of the source, a magnet 99 surrounding the drift tube 98, a focusing electrode 127 between the cathode 101 and the drift tube 98, the opposite side of the cathode 101 leading to the open end of the source 91 having focusing and accelerating electrodes 128, 111 and 142, means, battery 117, to polarize the drift tube 98 positively relative to the cathode 101 and means 117 to appropriately polarize the focusing and accelerating electrodes 127 and 128, said cathode 101 being the sole source of electrons, the arrangement being such that an electron stream flows in reverse direction through the drift tube 98 toward the closed end 102 of the source and resulting ions flow in a forward direction of the electron stream and through the focusing and accelerating electrodes 111 and 128 toward the discharge end 91 of the source.

It is obvious that various changes and modifications may be made to the details of construction without departing from the general spirit of the invention as set forth in the appended claims.

I claim:

1. The combination of a chambered object to be tested for leaks, pumps evacuating said object, a gettering chamber connected to said chambered object, said gettering chamber having a titanium-coated wall to remove objectional residual background gases, a sprayer spraying an inert gas of extremely low concentration such as helium gas at the outer face of the chambered object to be tested, the chambered object and gettering chamber successively receiving the helium gas that passes into the chambered object through a leak, the gettering chamber eliminating most of the gases accompanying the helium gas to form a gas mixture mainly composed of the helium gas being sprayed by said sprayer, a mass spectrometer type tube connected to said gettering chamber and receiving said gas mixture, said mass spectrometer type tube comprising an ion producing source with an electron beam-producing source through which said gas mixture passes to form ions, said mass spectrometer type tube further comprising in succession means to produce a magnetic field, a baffle, a collector type plate, conductors, and an external output meter connected to said collector plate by said conductors, said magnetic field separating the helium ions from said gas mixture, the baffle isolating the helium ions, the collector plate receiving the helium ions so isolated to produce a current in the conductors and output meter, the current so produced in the conductors and output meter indicating on said meter the magnitude of the ions received from said collector plate and thereby an indication of the presence of a leak in said chambered object.

2. The combination as set forth in claim 1 in which said ion producing source is closed at one end and open at the opposite end for discharge of an ion stream, said ion producing source comprising a gas connection from said gettering chamber for admitting said gas mixture including helium to be ionized, an electron-emitting cathode, a long drift tube disposed on the side of the cathode remote from the discharge end of the source, a magnet surrounding the drift tube, a focusing electrode between the cathode and the drift tube, the opposite side of the cathode leading to the open end of the source having focusing and accelerating electrodes, means to polarize the drift tube positively relative to the cathode, and means to appropriately polarize the focusing and accelerating electrodes, said cathode being the sole source of electrons, the arrangement being such that an electron stream flows in reverse direction through the drift tube toward the closed end of the source, and resulting ions flow in a forward direction opposite to the direction of the electron stream and through the focusing and accelerating electrodes, toward the discharge end of the source.

References Cited by the Examiner
UNITED STATES PATENTS

| | | | |
|---|---|---|---|
| 2,486,199 | 10/1949 | Nier | 73—40.7 |
| 2,581,446 | 1/1952 | Robinson | 250—41.9 |
| 2,636,990 | 4/1953 | Gow et al. | 250—41.9 |
| 2,831,996 | 4/1958 | Martina | 250—41.9 |
| 3,070,992 | 1/1963 | Nemeth | 73—40.7 |
| 3,157,784 | 11/1964 | O'Meara | 250—41.9 |

OTHER REFERENCES

Nier et al.: "Mass Spectrometer for Leak Detection," Journal of Applied Physics, January 1947, vol. 18, Number 1, pages 30–33.

Nier: "A Mass Spectrometer for Isotope and Gas Analysis," The Review of Scientific Instruments, vol. 18, Number 6, June, 1947, pages 398 to 411.

Polonyi: "Mass Spectrometry in the Electronics Industry," The Sylvania Technologist, vol. 7, Number 2, April 1954, pages 51 to 58.

RALPH G. NILSON, *Primary Examiner.*

FREDERICK M. STRADER, *Examiner.*